(12) United States Patent
Mohamed et al.

(10) Patent No.: US 9,819,527 B2
(45) Date of Patent: Nov. 14, 2017

(54) TRANSMITTER FOR SPATIAL MODULATION IN A HIGH-EFFICIENCY WIRELESS LOCAL-AREA NETWORK

(71) Applicant: Intel IP Corporation, Santa Clara, CA (US)

(72) Inventors: Ahmed Gamal Helmy Mohamed, Richardson, TX (US); Shahrnaz Azizi, Cupertino, CA (US); Thomas J. Kenney, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/975,190

(22) Filed: Dec. 18, 2015

(65) Prior Publication Data

US 2017/0005846 A1   Jan. 5, 2017

Related U.S. Application Data

(60) Provisional application No. 62/188,236, filed on Jul. 2, 2015.

(51) Int. Cl.
| | |
|---|---|
| *H04L 27/26* | (2006.01) |
| *H04B 7/0413* | (2017.01) |
| *H04B 7/06* | (2006.01) |
| *H04W 84/12* | (2009.01) |

(52) U.S. Cl.
CPC ....... *H04L 27/2627* (2013.01); *H04B 7/0413* (2013.01); *H04B 7/0697* (2013.01); *H04L 27/2602* (2013.01); *H04W 84/12* (2013.01)

(58) Field of Classification Search
CPC ............ H04L 27/2627; H04L 27/2602; H04B 7/0697; H04B 7/0413; H04W 84/12
See application file for complete search history.

(56) References Cited

U.S. PATENT DOCUMENTS

| | | | | |
|---|---|---|---|---|
| 2006/0093059 | A1* | 5/2006 | Skraparlis ........... | H03M 13/275 375/267 |
| 2007/0140100 | A1* | 6/2007 | Ouyang .............. | H03M 13/271 370/203 |
| 2008/0037673 | A1* | 2/2008 | Ahn ..................... | H04B 7/0413 375/261 |
| 2012/0230448 | A1* | 9/2012 | Kang ................ | H03M 13/6527 375/295 |
| 2015/0195018 | A1* | 7/2015 | Xiao ..................... | H04B 7/063 375/267 |

* cited by examiner

*Primary Examiner* — Syed Haider
(74) *Attorney, Agent, or Firm* — Schwegman Lundberg & Woessner, P.A.

(57) ABSTRACT

A transmitter for spatial modulation in a high-efficiency wireless local-area network is disclosed. An apparatus is disclosed that comprises memory and circuitry coupled to the memory. The processing circuitry configured to split a data bitstream between an antenna bitstream and a symbol bitstream, encode the data bitstream into a plurality of orthogonal frequency-division multiplexing (OFDM) symbols from a signal constellation, encode the antenna bitstream into a plurality of antenna indices from a space constellation, map symbols of the plurality of symbols to a plurality of subcarriers of a channel and associate the symbols with an index of the plurality of indices. The processing circuitry may be configured to configure the access point for transmission of the symbols on the channel in accordance with an associated one of the antenna indices.

20 Claims, 6 Drawing Sheets

US 9,819,527 B2

TRANSMITTER FOR SPATIAL MODULATION IN A HIGH-EFFICIENCY WIRELESS LOCAL-AREA NETWORK

PRIORITY CLAIM

This application claims the benefit of priority under 35 USC 119(e) to U.S. Provisional Patent Application Ser. No. 62/188,236, filed Jul. 2, 2015, which is incorporated herein by reference in its entirety.

TECHNICAL FIELD

Embodiments relate to wireless devices. Some embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to transmitting in accordance with spatial modulation (SM) and orthogonal frequency-division multiplexing (OFDM). Some embodiments relate to transmitting in accordance with multiple-input and multiple-output (MIMO).

BACKGROUND

Efficient use of the resources of a wireless local-area network (WLAN) is important to provide bandwidth and acceptable response times to the users of the WLAN. Moreover, wireless devices may need to operate with both newer protocols and with legacy device protocols, and may need to operate in range of more than one access point. Additionally, many Internet of Things (IoT) wireless devices are sharing the wireless medium with more sophisticated traditional wireless devices.

Thus, there are general needs for methods, apparatuses, and computer readable media for a transmitter for spatial modulation.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
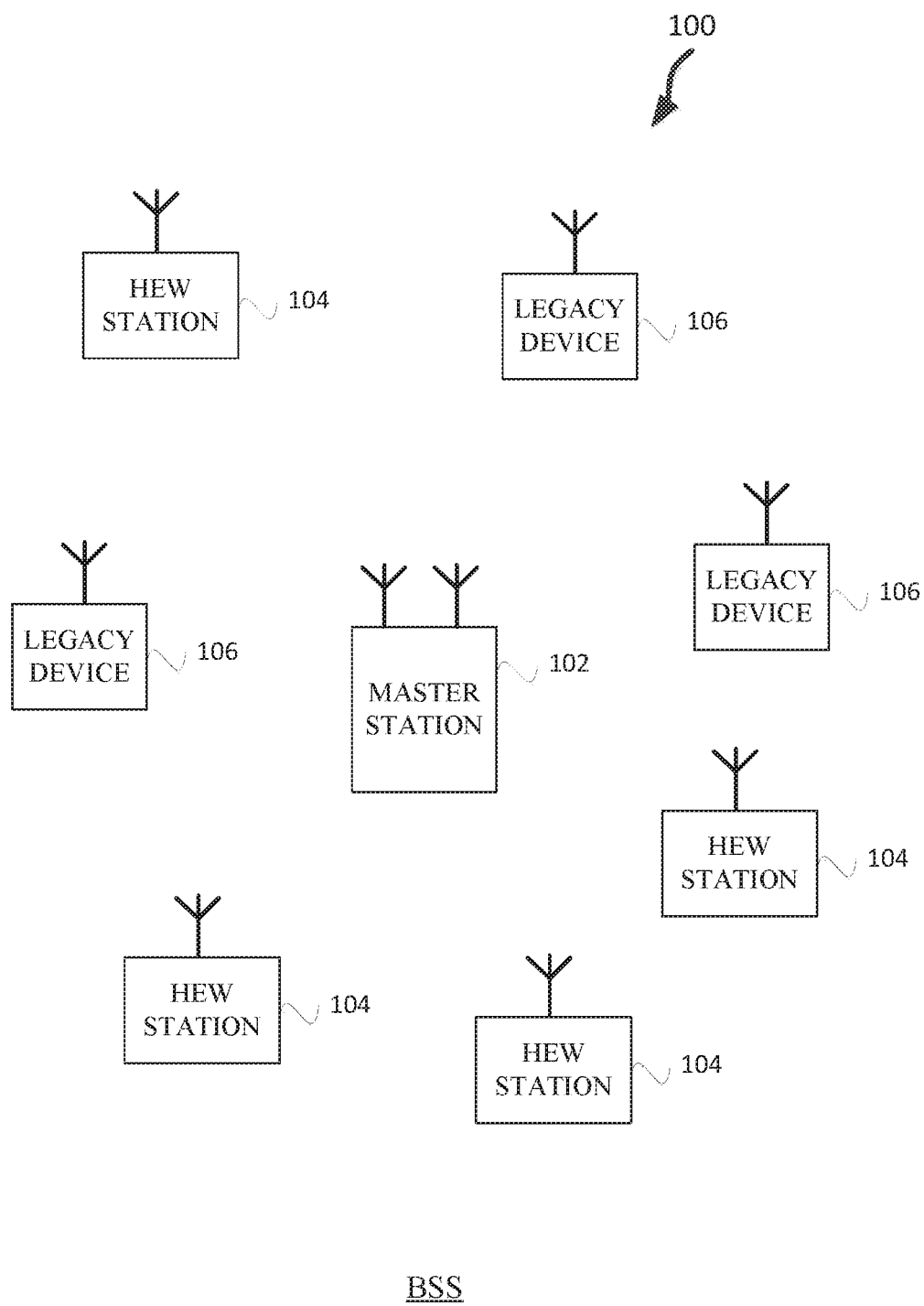
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-6.

Figure 2:
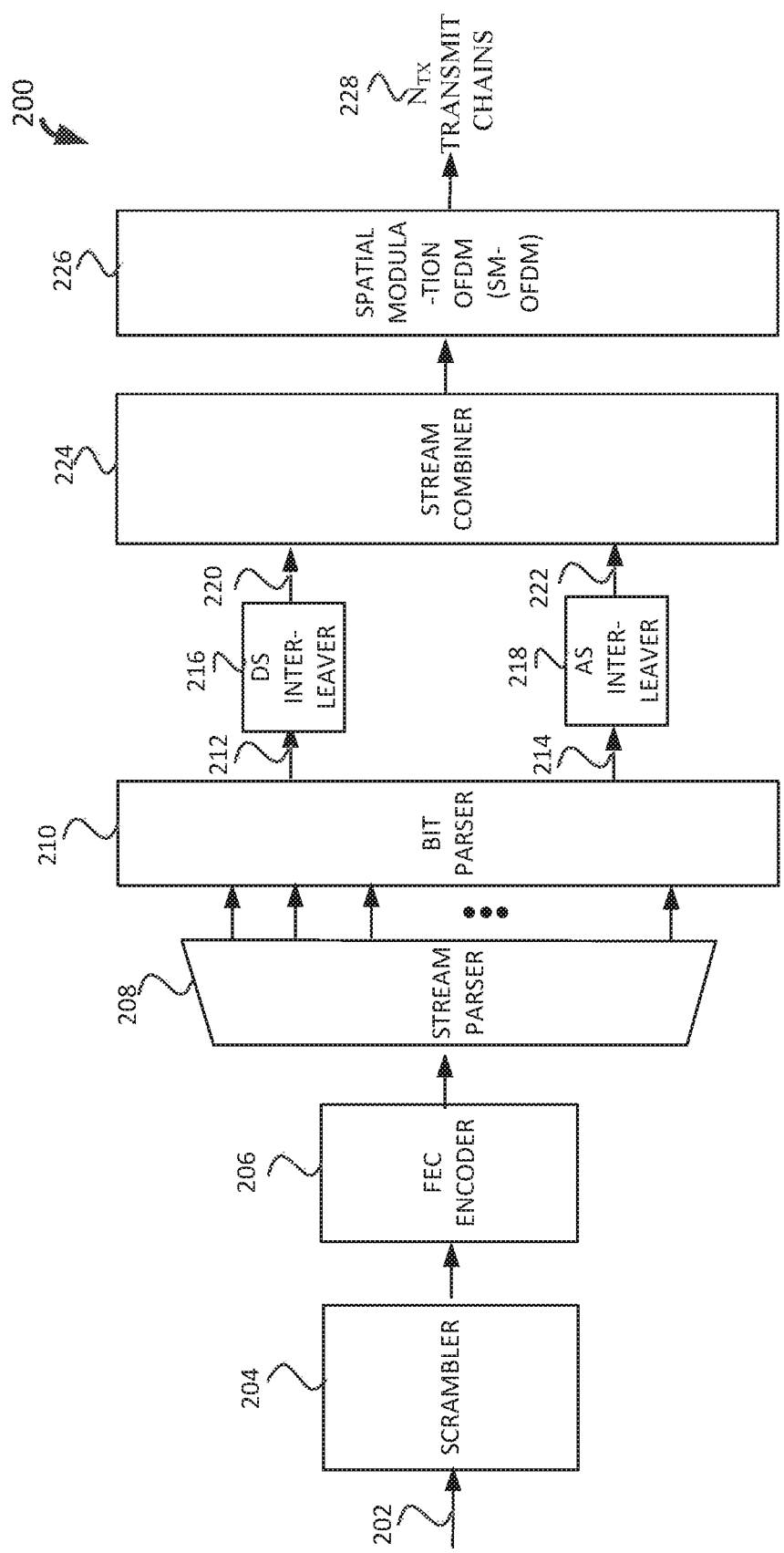
FIG. 2 illustrates a transmitter block diagram in accordance with some embodiments.

FIG. 2 illustrates a transmitter block diagram 200 in accordance with some embodiments. In some embodiments, in FIG. 2 the number of incoming bitstreams are equal to the number of the active transmit antennas. In some embodiments the number of receive antennas $N_R$ is at least as large as the number of transmit streams.

The data bits 202 may be bits that are to be transmitted and that are received from, for example, a media access control (MAC) layer. The disclosure in conjunction with FIG. 2 describes the data field portion of a packet generation. In some embodiments, the data bits 202 may be prepended with a service field.

In some embodiments, the data bits 202 may be padded so that the resulting length can be divided equally into a number of OFDM symbols. N pad may be the number of the padding bits per each packet. In some embodiments, each packet may be extended with padding bits (all zeros) such that the resulting length can be divided equally into an integer multiple of OFDM symbols. Based on the number of OFDM symbols described below ($N_{SYM}$), the number of the padding bits is as follows:

$N_{Pad}=N_{SYM}*R*LCM((mN_{ss}+n)*N_{DS}, R^{-1})-(8*length+16+6\cdot N_{ES})$, where R is the code rate defined by the MCS; $N_{SS}$ is the number of spatial streams, $N_{ES}$ is a number of the BCC encoders, $N_{DS}$ is the number of the data subcarriers at each OFDM symbol, length is the value of the length field in octets in a signal field defined in the preamble structure, and the operation LCM(a,b) is the smallest integer greater than or equal to x and the least common multiplier operation between a and b.

The scrambler 204 may be in accordance with one or more IEEE 802.11 standards. The scrambler 204 may append zero bits to the front of the data bits 202. The data bits 202 are then scrambled. A descrambler (not illustrated) is used at the receiver (not illustrated) to descramble the bits.

The scrambled bits are then encoded by a forward error correction (FEC) 206 encoder. For example, the FEC 206 encoder may be a binary convolution encoder (BCC). In some embodiments, the BCC may have a constraint length of 7 and a generator polynomial of octal.

The FEC bits are feed into the stream parser 208. The FEC bits may be re-arranged by the stream parser 208 into a number of different bit strings equal to a number of spatial streams $N_{SS}$. The FEC bits may be assigned to different spatial streams in, for example, a round robin method.

The bits from the stream parser 208 are feed into the bit parser (BP) 210. Only one stream is illustrated. The BP 210 splits the bits between data stream (DS) interleaver 216 and the antenna selection (AS) interleaver 218. The number of different bits to split for the DS interleaver 216 and the AS interleaver 218 can be determined as follows.

In SM-OFDM, at each subcarrier includes two pieces of information transmitted by the master station 102. The two pieces of information are $mN_{ss}$ bits and n bits. The $mN_{ss}$ bits represents a symbol chosen from a constellation diagram $m=\log_2 M$, where M is the signal constellation alphabet size and $N_{ss}$ is the number of transmitter streams, which may be defined by the modulation and coding scheme (MCS) from the MAC layer.

The n bits represent an antenna index. A unique active transmit antenna index or more than one active transmit antenna combination indices that is to be chosen from a set of possible transmit antennas combinations to be only used during transmission.

The number of bits that can be encoded by the antenna selection is given by:

$$n = \left\lfloor \log_2\left(\binom{N_T}{N_{act}}\right) \right\rfloor_2,$$

where $\lfloor \cdot \rfloor_2$ is the floor operation to the nearest integer that can be expressed as a power of 2, $N_T$ is the number of transmit antennas, and $N_{act}<N_T$ is the number of active transmit antennas. The selection of n may be from what may be termed a space constellation, which represents the different possible antenna selections.

The net result of embedding the space constellation part of the information to be transmitted via the index of the transmit-antenna at the master station 102 is a hybrid modulation and MIMO technique.

$N_{SYM}$ may be the number of the OFDM symbols in the data field per each packet. For a given MCS and antenna configuration in SM-OFDM, the total number of coded bits transmitted at each subcarrier is $mN_{ss}$+n bits/subcarrier. In some embodiments the number of coded bits transmitted at each subcarrier is $mN_{ss}$ bits/subcarrier in accordance with one or more of the legacy communication standards (e.g., IEEE 802.11n, or 802.11ac). The total number of the OFDM symbols in the data field $N_{SYM}$ will be as follows:

$$N_{SYM} = m_{STBC} \left\lceil \frac{8*length+16+6*N_{ES}}{m_{STBC}[R*LCM((mN_{ss}+n)*N_{ds}, R^{-1})]} \right\rceil,$$

where R is the code rate defined by the MCS; $N_{SS}$ is the number of the BCC encoders; $N_{DS}$ is the number of the data subcarriers at each OFDM symbol; length is the value of the length field in octets in a signal field defined in the preamble structure; operation ⌈x⌉ is the smallest integer greater than or equal to x; the operation LCM(a,b) is the smallest integer greater than or equal to x and the least common multiplier operation between a and b; and, $m_{STBC}$ is equal to 2 for STBC mode and 1 otherwise.

As disclosed above, the BP 210 splits the bits between a data stream DS interleaver 216 and the AS interleaver 218. In some embodiments, the DS interleaver 216 and the AS interleaver 218 interleave the antenna selection and data coded bits, respectively, in accordance with BCC coding at the FEC 206. In some embodiments a different FEC 206 is used such as low-density parity-check (LDPC) in which case the DS interleaver 216 and the AS interleaver 218 may be configured to operate differently.

Some embodiments of the DS interleaver 216 and the AS interleaver 218 reuse portions of a legacy transmitter design, legacy IEEE 802.11 system parameters and system blocks.

Some embodiments have the technical effect of making the design less complicated and smaller through the reuse of existing system blocks and thus hardware, and thus less expensive. Some embodiments reuse one or more of the following: an existing channel interleaver used in legacy IEEE 802.11 OFDM systems, current code rates and modulation types. Moreover, for a given MCS and antenna configuration, the total number of coded bits transmitted at each subcarrier will be $mN_{ss}$+n bits/subcarrier. Hence, the equivalent number of bits/subcarrier/stream will be equal to: $(mN_{ss}+n)/N_{ss}$ (i.e., setting $(mN_{ss}+n)$ equal to the number of bits encoded by the symbol constellation in the legacy systems). In some embodiments, $(mN_{ss}+n)/N_{ss}$ is equivalent to one of the available MCSs defined in IEEE 802.11a/b/g/n/ac. The equivalent number of bits/subcarrier/stream to $(mN_{ss}+n)/N_{ss}$ will not be defined in a legacy IEEE 802.11 as one of the standard MCSs, hence.

Some embodiments reuse the existing system parameters and system blocks to the largest extent possible. The AS interleaver 218 may be a separate single-stream interleaver block for the antenna selection bitstream (n bits/subcarrier) for the case of BCC coding at the FEC 206.

In some embodiments, the DS interleaver 216 may use a legacy multi-stream interleaver block used in previous IEEE 802.11 OFDM systems for the data bitstreams (m bits/subcarrier/stream for $N_{ss}$ spatial streams, where $mN_{ss}$ bits/subcarrier is used instead of $N_{ss}$). In some embodiments, the existing system blocks are used except the AS interleaver 218 for the antenna selection bits.

Table 1 discloses interleaver parameters for the case of 1 to 4 spatial streams, where $N_{BPSCS}$ is the number of coded bits per subcarrier for each spatial stream.

TABLE 1

Number of Rows and Columns in an Interleaver

| Parameter | 20 MHz | 40 MHz | 80 MHz |
| --- | --- | --- | --- |
| $N_{COL}$ | 13 | 18 | 26 |
| $N_{ROW}$ | 4 × $N_{BPSCS}$ | 6 × $N_{BPSCS}$ | 9 × $N_{BPSCS}$ |
| $N_{ROT}$ | 11 | 29 | 58 |

Table 1 discloses the number of coded symbols that are stored in the interleaver. In some embodiments, legacy interleaver methods in accordance with one or more legacy standards (e.g., IEEE 802.11n) are used with the parameters disclosed in Table 1 of $N_{COL}$, $N_{ROW}$, and $N_{ROT}$. The operation of both AS Interleaver 218 and DS Interleaver 216 are described herein.

The following discloses the operation of the AS interleaver 218 in accordance with a single stream transmission. The AS interleaver 218 is configured to interleave the antennas selection bitstream based on the interleaving operation defined in the legacy standard IEEE 802.11a/g and IEEE 802.11n/ac/ah, which consists of two interleaver permutations. The first permutation ensures that adjacent coded bits are mapped onto non-adjacent subcarriers. The second permutation ensures that coded bits are mapped alternately onto less and more significant bits of the constellation and thereby long runs of low reliability (LSB) bits are avoided. The output of the first interleaver permutation for the antenna selection bitstream, $w_K$, is a function of the output of the BP 210 block for the antenna selection bitstream, $x_i$, and is defined as follows:

$w_K = x_i$, where $$i = Nrow*(k \mod Ncol) + \left\lfloor \frac{k}{Ncol} \right\rfloor,$$

k=0, 1, . . . , n*$N_{ds}$−1, and $N_{BPSCS}$=n, which may be used to determineNrow from Table 1.

The output of the second interleaver permutation, $y_k$, is a function of the output of the first permutation, $w_j$, and is defined as follows:

$$y_k = w_j, \text{ and } j = s*\left\lfloor \frac{k}{s} \right\rfloor + \left(k + n*N_{ds} - \left\lfloor \frac{Ncol*k}{n*N_{ds}} \right\rfloor \right) \mod s,$$

where k=0, 1, . . . , n*$N_{ds}$−1, and $$s = \max\left\{1, \frac{n}{s}\right\}$$

which is the single axis block size of a constellation point. In some embodiments, the AS interleaver 218 is configured differently for a different number of spatial streams.

The DS interleaver 216 is configured to interleave the data bitstreams based on two basic interleaver permutations described above plus a third permutation operation if more than one spatial streams exist (i.e. $N_{ss}>1$). The third permutation ensures that the coded bits are mapped to achieve better frequency-spatial diversity among all spatial streams via frequency rotation to the additional spatial streams. The output of the first interleaver permutation for the antenna selection bitstream, $w_k^{iss}$, is a function of the output of the BP 210 for the antenna selection bitstream, $x_i^{iss}$, and is defined as follows $$w_k^{iss} = x_i^{iss}, \text{ and } i = Nrow*(k \bmod Ncol) + \left\lfloor \frac{k}{Ncol} \right\rfloor,$$

where $1 \leq i_{ss} \leq N_{ss}$ and $k=0, 1, \ldots, N_{CBPSS}-1$. The output of the second interleaver permutation, $y_k^{iss}$, is a function of the output of the first permutation, $w_j^{iss}$, and is defined as follows $$y_k^{iss} = w_j^{iss}, \text{ and } j = s * \left\lfloor \frac{k}{s} \right\rfloor + \left(k + N_{CBPSS} - \left\lfloor \frac{Ncol, k}{N_{CBPSS}} \right\rfloor\right) \bmod s,$$

where $1 \leq i_{ss} \leq N_{ss}$, $k=0, 1, \ldots, N_{CBPSS}-1$, and $$s = \max\left\{1, \frac{N_{BPSCS}}{2}\right\}$$

which is the single axis block size of a constellation point. If more than one spatial streams exist, the third permutation is applied and the output of the third interleaver permutation, $z_k^{iss}$, is a function of the output of the second permutation, $y_r^{iss}$, and is defined as follows $$z_k^{iss} = y_r^{iss} \text{ and } r =$$
$$s * \left\lfloor \frac{k}{s} \right\rfloor + \left(k - \left((2*(i_{ss}-1)) \bmod 3 + 3 * \left\lfloor \frac{i_{ss}-1}{3} \right\rfloor\right) * Nrot * N_{BPSCS}\right)$$
$$\bmod N_{CBPSS}.$$

where $1 \leq i_{ss} \leq N_{ss}$, $k=0, 1, \ldots, N_{CBPSS}-1$, and $N_{CBPSS}$ is the number of the coded bits per spatial stream.

In some embodiments, the structure of the DS interleaver 216 is similar or the same as the DS interleaver used in IEEE 802.11 standards, when BCC encoding is used.

Moreover, the interleaver operation separation described above puts a constraint on the allowed antenna configurations for the SM-OFDM, since n should take one of the modulation orders available in the IEEE 802.11 standards (i.e. n can only take the values of 1, 2, or 4 defined by the modulation order of BPSK, QPSK, and 16QAM respectively). Hence, the selection of the antenna configures may be restricted. For example, the configuration SM-OFDM 8×1 will not be allowed as it requires n=3, which is not an allowed modulation order. Table 2 provides some of the available antenna configuration for some scenarios based on the above discussion.

TABLE 2

Antenna Configurations for SM-OFDM

| | |
|---|---|
| 1 (BPSK) | 2 × 1, 3 × 1, 3 × 2 |
| 2 (QPSK) | 4 × 1, 4 × 2, 5 × 1, 6 × 1, 7 × 1 |
| 3 (Not available) | 8 × 1, 5 × 2, 6 × 2 |
| 4 (16 QAM) | 7 × 2, 8 × 2 |

Some embodiments of the SM-OFDM provide a new design of the MIMO-OFDM waveform which may provide better communication performance for receivers with a limited number of RF chains. Some embodiments of the SM-OFDM provide an increase in the overall system spectral efficiency using the same number of the RF chains available at the master station 102 compared with the conventional MIMO.

The output 220 of the DS interleaver 216 and the output 222 of the AS interleaver 218 are feed into a stream combiner 224. The stream combiner 224 may combine the output 220 and output 222 for transmission of the SM and OFDM portion together. The output of the stream combiner 224 may be feed into the OFDM spatial modulation (SM OFDM) 226 where a symbol from a constellation diagram may be selected in accordance with a MCS and where the symbol is paired with an antenna selection to represent the n bits of the antenna selection for $(mN_{ss}+n)$ output bits. The output of the SM OFDM 226 is to $N_{TX}$ transmit chains 228. $N_{TX}$ transmit chains 228 may include a cyclic shift diversity (CSF), spatial mapping, inverse discrete Fourier Transform (IDFT), insertion of guard intervals and analog RF transmission. One skilled in the art would recognize that the receiver block diagram for the transmitted packets of the transmitter block diagram 200 would be the same or similar to the encoding of the packet in a reverse order. For example, a receiver may determine which antennas were used to transmit a plurality of subcarriers and then decode the antenna index to determine a portion of the antenna bitstream.

Figure 3:
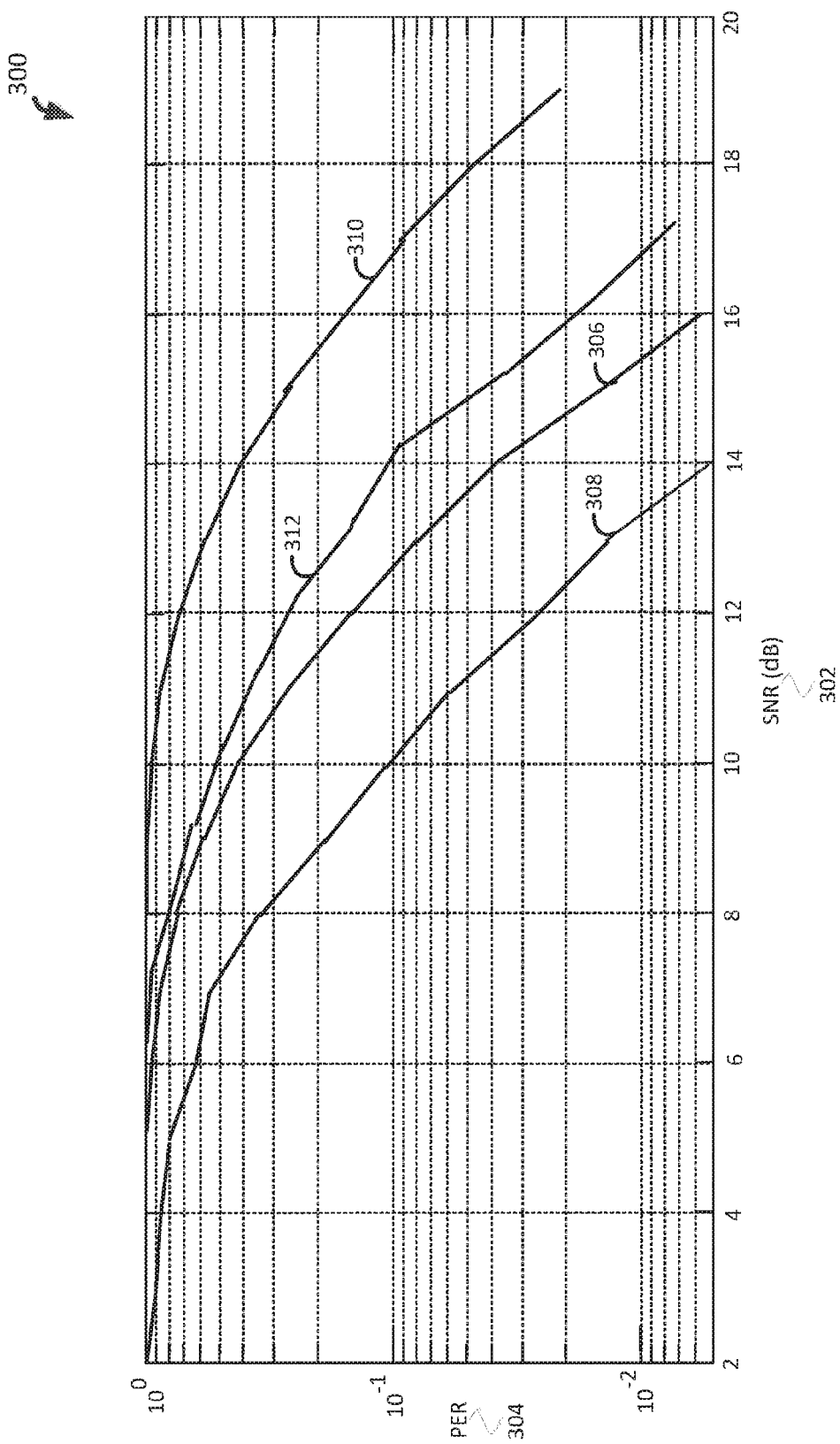
FIG. 3 illustrates spatial modulation performance compared with space-time block coding (STBC) in accordance with some embodiments.

FIG. 3 illustrates spatial modulation performance compared with space-time block coding (STBC) in accordance with some embodiments. Illustrated in FIG. 3 is signal-to-noise (SNR) ratio dB 302 along a horizontal axis and packet error rate (PER) 304 along a vertical axis. FIG. 3 illustrates the results of a simulation with parameters of channel D, 20 MHz, 1000 byte (BCC), non-line of sight (NLOS), with no impairments.

Curve 306 is STBC with 2 information bits per subcarrier per two OFDM symbols. The MCS of curve 306 is 16QAM with MCS of 3. Curve 308 is SM-OFDM with 2 information bits per subcarrier per two OFDM symbols. The MCS of curve 308 is BPSK with MCS of 0. Curve 310 is STBC with 3 information bits per subcarrier per two OFDM symbols. The MCS of curve 310 is 16QAM with MCS of 4. Curve 312 is SM-OFDM with 3 information bits per subcarrier per two OFDM symbols. The MCS of curve 312 is BPSK with MCS of 1. FIG. 3 illustrates that curve 308 and curve 312 achieve approximately 2-3 dB gain compared with curve 306 and curve 310 respectively. Curve 308 and curve 312 are in accordance with some embodiments.

Figure 4:
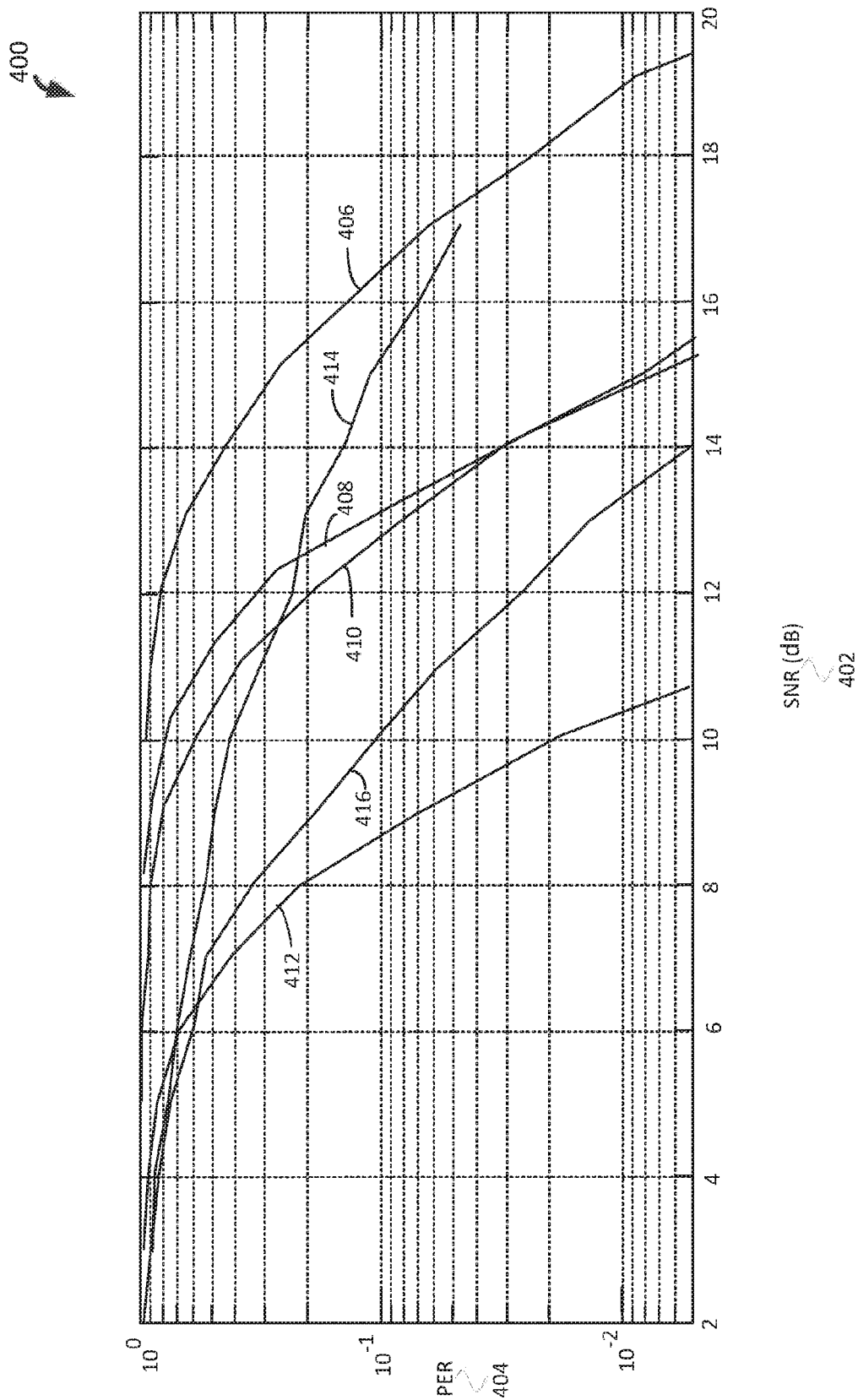
FIG. 4 illustrates spatial modulation performance compared with direct mapping in accordance with some embodiments.

FIG. 4 illustrates spatial modulation performance compared with direct mapping in accordance with some embodiments. Illustrated in FIG. 4 is signal-to-noise (SNR) ratio dB 402 along a horizontal axis and packet error rate (PER) 404 along a vertical axis. FIG. 4 illustrates the results of a simulation with parameters of channel D, 20 MHz, 1000 byte (BCC), non-line of sight (NLOS), with no impairments.

Curve 406 is direct mapping with 3 information bits per subcarrier per two OFDM symbols. The MCS of curve 406 is QPSK with MCS of 10. Curve 408 is SM-OFDM with 3 information bits per subcarrier per two OFDM symbols. The MCS of curve 408 is QPSK with MCS of 0. Curve 410 is direct mapping with 2 information bits per subcarrier per two OFDM symbols. The MCS of curve 410 is QPSK with MCS of 9. Curve 412 is SM-OFDM with 2 information bits per subcarrier per two OFDM symbols. The MCS of curve 412 is BPSK with MCS of 8.

Curve 414 is direct mapping with 1 information bits per subcarrier per two OFDM symbols. The MCS of curve 414 is QPSK with MCS of 1. Curve 416 is SM-OFDM with 1 information bits per subcarrier per two OFDM symbols. The MCS of curve 416 is BPSK with MCS of 0.

FIG. 4 illustrates that curve 408, curve 412, and curve 416 achieve approximately 4-5 dB gain compared with curve 406, curve 410 and curve 414 respectively. Curve 408, curve 412, and curve 416 are in accordance with some embodiments. The simulation 400 may be a master station 102 to IoT devices and wearable clients.

Some embodiments provide a transmission technique as a replacement of the Space-Time Block Coding (STBC) technique. Some embodiments avoid the reduced PHY rate obtained with STBC. Some embodiments increase the overall system spectral efficiency with the same number of the RF chains available at the master station 102 compared with legacy MIMO.

Figure 5:
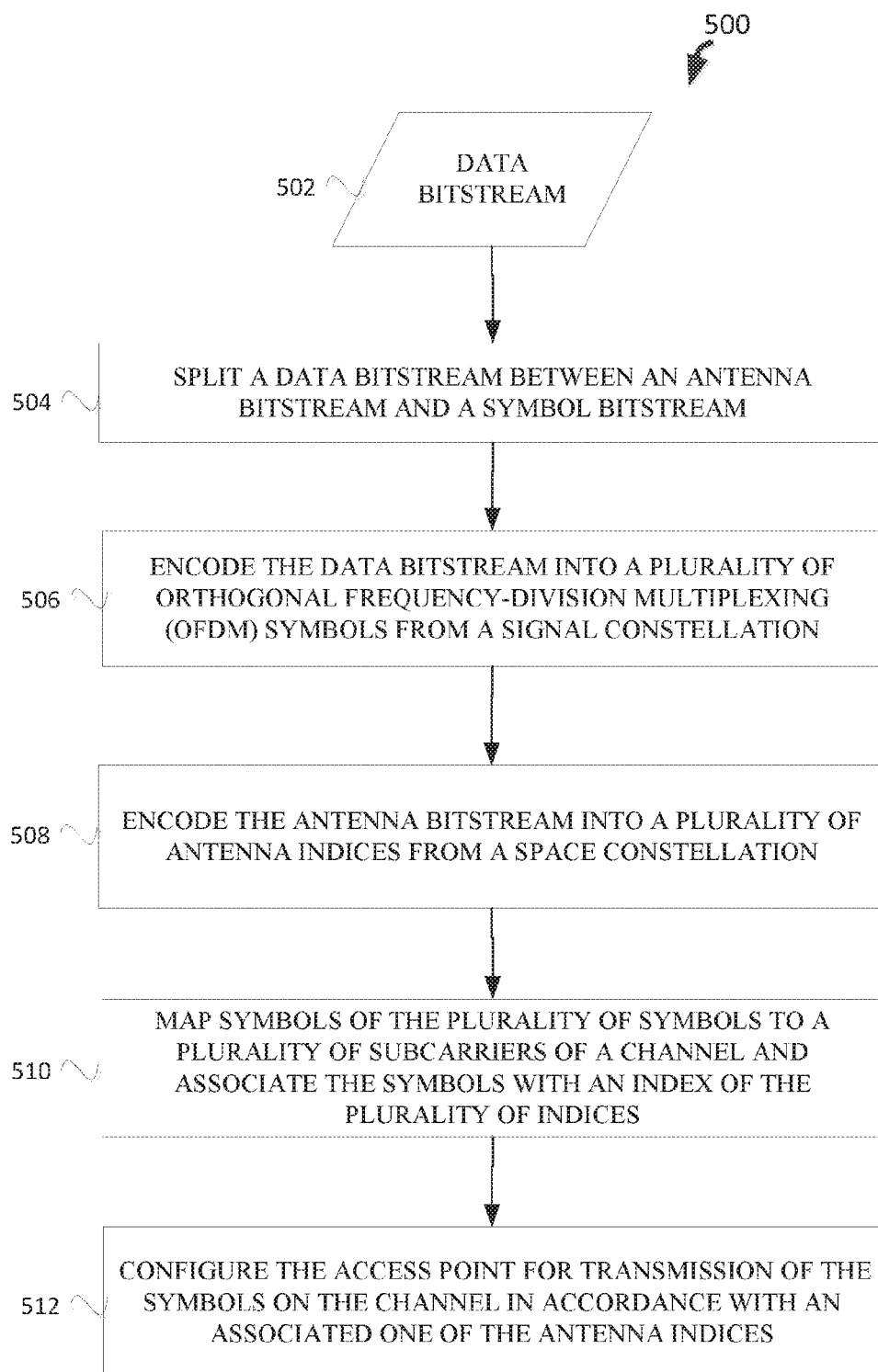
FIG. 5 illustrates a method of transmitting in accordance with SM and OFDM in accordance with some embodiments.

FIG. 5 illustrates a method 500 of transmitting in accordance with SM and OFDM in accordance with some embodiments. The method 500 starts at operation 502 with generating a data bitstream. For example, the data bitstream may be data bits 202 (FIG. 2) that are to be transmitted and that are received from, for example, a media access control (MAC) layer.

The method 500 continues at operation 504 with splitting a data bitstream between an antenna bitstream and a symbol bitstream. For example, the BP 210 splits the bits between DS interleaver 216 and AS interleaver 218.

In some embodiments, prior to operation 504 the data bitstream may be scrambled (scrambler 204), encoded (FEC encoder 206), and parsed (stream parser 208).

The method 500 continues at operation 506 with encoding the data bitstream into a plurality of OFDM symbols from a signal constellation. For example, the spatial modulation OFDM (SM-OFDM) 226 of FIG. 2 selects a symbol from a constellation diagram in accordance with a MCS and where the symbol is paired with an antenna selection for transmission.

The method 500 continues at operation 508 with encoding the antenna bitstream into a plurality of antenna indices from a space constellation.

For example, the spatial modulation OFDM (SM-OFDM) 226 of FIG. 2 may map an antenna selection of an antenna index to represent bits of the antenna bitstream. Prior to operations 506 and 508, the stream combiner 224 may combine bits of the antenna bitstream and data bitstream to be transmitted together.

The method 500 continues at operation 510 with mapping symbols of the plurality of symbols to a plurality of sub-carriers of a channel and associate the symbols with an index of the plurality of indices. For example, the spatial modulation OFDM (SM-OFDM) 226 of FIG. 2 may map the symbols to actual sub-carriers of a channel for transmission where the transmission will be performed in accordance with the antenna selection.

The method 500 may continue at operation 512 with configuring the access point for transmission of the symbols on the channel in accordance with an associated one of the antenna indices. For example, the spatial modulation OFDM (SM-OFDM) 226 of FIG. 2 and the $N_{TX}$ transmit chains may configure a master station 102 or HEW device 104 to transmit in accordance with the mapped symbols to sub-carriers and the associated antenna index. One skilled in the art would recognize additional steps may be included in the method 500 related to encoding, interleaving, padding, and transmitting, as described herein.

Some embodiments relate to determining a number of OFDM symbols in a data field per each packet. Some embodiments relate to determining a number of padding bits per packet. Some embodiments relate to interleaving for block convolution coding (BCC).

Figure 6:
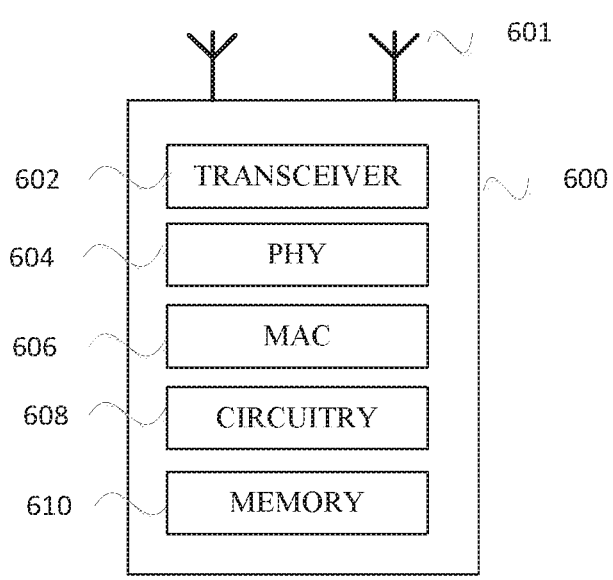
FIG. 6 illustrates a HEW device in accordance with some embodiments.

FIG. 6 illustrates a HEW device 600 in accordance with some embodiments. HEW device 600 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 600 may be suitable for operating as master station 102 (FIG. 1) or a HEW STA 104 (FIG. 1). In accordance with embodiments, HEW device 600 may include, among other things, a transmit/receive element 601 (for example an antenna), a transceiver 602, physical (PHY) circuitry 604, and media access control (MAC) circuitry 606. PHY circuitry 604 and MAC circuitry 606 may be HEW compliant layers and may also be compliant with one or more legacy IEEE 802.13 standards. MAC circuitry 606 may be arranged to configure packets such as a physical layer convergence procedure (PLCP) protocol data unit (PPDUs) and arranged to transmit and receive PPDUs, among other things. HEW device 600 may also include circuitry 608 and memory 610 configured to perform the various operations described herein. The circuitry 608 may be coupled to the transceiver 602, which may be coupled to the transmit/receive element 601. While FIG. 6 depicts the circuitry 608 and the transceiver 602 as separate components, the circuitry 608 and the transceiver 602 may be integrated together in an electronic package or chip.

In some embodiments, the MAC circuitry 606 may be arranged to contend for a wireless medium during a contention period to receive control of the medium for the HEW control period and configure an HEW PPDU. In some embodiments, the MAC circuitry 606 may be arranged to contend for the wireless medium based on channel contention settings, a transmitting power level, and a CCA level.

The PHY circuitry 604 may be arranged to transmit the HEW PPDU. The PHY circuitry 604 may include circuitry for modulation/demodulation, upconversion/downconversion, filtering, amplification, etc. In some embodiments, the circuitry 608 may include one or more processors. The circuitry 608 may be configured to perform functions based on instructions being stored in a RAM or ROM, or based on special purpose circuitry. The circuitry 608 may be termed processing circuitry in accordance with some embodiments. The circuitry 608 may include a processor such as a general purpose processor or special purpose processor. The circuitry 608 may implement one or more functions associated with transmit/receive elements 601, the transceiver 602, the PHY circuitry 604, the MAC circuitry 606, and/or the memory 610.

In some embodiments, the circuitry 608 may be configured to perform one or more of the functions and/or methods described herein and/or in conjunction with FIGS. 1-6.

In some embodiments, the transmit/receive elements 601 may be two or more antennas that may be coupled to the PHY circuitry 604 and arranged for sending and receiving signals including transmission of the HEW packets. The transceiver 602 may transmit and receive data such as HEW PPDU and packets that include an indication that the HEW device 600 should adapt the channel contention settings according to settings included in the packet. The memory 610 may store information for configuring the other circuitry to perform operations for configuring and transmitting HEW packets and performing the various operations to perform one or more of the functions and/or methods described herein and/or in conjunction with FIGS. 1-6.

In some embodiments, the HEW device 600 may be configured to communicate using OFDM communication signals over a multicarrier communication channel. In some embodiments, HEW device 600 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 600 may use 4× symbol duration of 802.11n or 802.11ac.

In some embodiments, an HEW device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 601 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus comprising memory and processing circuitry coupled to the memory, the processing circuitry configured to: split a data bitstream between an antenna bitstream and a symbol bitstream; encode the data bitstream into a plurality of orthogonal frequency-division multiplexing (OFDM) symbols from a signal constellation; encode the antenna bitstream into a plurality of antenna indices from a space constellation; map the OFDM symbols to a plurality of subcarriers of a channel and associate the OFDM symbols with an index of the plurality of antenna indices; and configure an access point for transmission of the symbols on the channel in accordance with an associated one of the antenna indices. The apparatus may be of an access point.

In Example 2, the subject matter of Example 1 can optionally include where a number of coded bits to be transmitted for the plurality of subcarriers is $mN\_ss+n$, wherein $n=\log\_2 N$ where N is an alphabet size of the space constellation, $m=\log\_2 M$, where m is the number of coded bits for each subcarrier and M is a signal constellation alphabet size, and $N\_ss$ is a number of spatial streams in accordance with a modulation and coding scheme (MCS).

In Example 3, the subject matter of Examples 1 or 2 can optionally include where a packet comprises the plurality of symbols and the plurality of antenna indices, and wherein the processing circuitry is further configured to: configure the access point for transmission of the packet in accordance with spatial modulation (SM) and OFDM.

In Example 4, the subject matter of Example 3 can optionally include where the packet is to be transmitted in accordance with multiple-input and multiple-output (MIMO).

In Example 5, the subject matter of Example 3 can optionally include where the processing circuitry is further configured to: encode a data portion of the packet with a number of the plurality of symbols, NSYM, wherein $NSYM=m\_STBC\ \lceil(8*length+16+6*N\_ES)/(m\_STBC\ [R*LCM((mN\_ss+n)*N\_ds,\ R^{\wedge}(-1))])\rceil$, where R is a code rate of the modulation and coding scheme (MCS), $N\_ES$ is a number of block convolution coding (BCC) encoders, Nds is the number of the data subcarriers at each OFDM symbol, NSS is the number of spatial streams (SS), length is a value of a length field in octets of the data portion of the packet, $m\_STBC$ is equal to 2 for space-time block code (STBC) mode and 1 otherwise, and LCM is the least common multiple (LCM).

In Example 6, the subject matter of Example 5 can optionally include where the processing circuitry is further configured to: pad the data portion of the packet with a number of padding bits (NPad), wherein $\lceil N \rceil\_Pad=N\_SYM*R*LCM((mN\_ss+n)*N\_ds,\ R^{\wedge}(-1))-(8*length+16+6*N\_ES)$.

In Example 7, the subject matter of any of Examples 1-6 can optionally include where the processing circuitry is further configured to: before the split, encode the data bitstream with a block convolution code (BCC), wherein a number of rows and a number of columns for the BCC is one from the following group: $(13, 4\times N\_BPSCS)$, $(18, 6*N\_BPSCS)$, and $(26, 9*N\_BPSCS)$, where $N\_BPSCS$ is a number of coded bits per subcarrier for each spatial stream (SS).

In Example 8, the subject matter of any of Examples 1-7 can optionally include where the processing circuitry is further configured to: interleave the antenna bitstream (xi)

with a first interleaver to produce a first interleaved bitstream (wK), wherein the interleave is in accordance with the following: w_K=x_i, where i=Nrow*(k mod Ncol)+⌊k/(Ncol)⌋, k=0, 1, . . . , n*N_DS-1, where n is a number of coded bits per spatial stream and $N_{DS}$ is the number of the data subcarriers at each OFDM symbol.

In Example 9, the subject matter of Example 8 can optionally include where the processing circuitry is further configured to: interleave the first interleaved bitstream (wK) with a second interleaver to produce a second interleaved bitstream (y_k), wherein the interleave is in accordance with the following: y_k=w_j, and j=s*⌊k/s⌋+(k+n*N_ds-⌊(Ncol*k)/(n*⌈N⌉_DS)⌋)mod s, where k=0, 1, . . . , n*N_ds-1, and s=max{1,n/2}, which is a single axis block size of a constellation point, and wherein the processing circuitry is further configured to: encode the second interleaved bitstream (y_k) into the plurality of antenna indices from a space constellation.

In Example 10, the subject matter of Example 9 can optionally include where the processing circuitry is further configured to: apply the first interleaver and the second interleaver to the data bitstream to produce a second interleaved data bitstream; and encode the second interleaved data bitstream into the plurality of OFDM symbols from the signal constellation.

In Example 12, the subject matter of Example 10 can optionally include where the processing circuitry is further configured to: if more than one spatial stream is to be used, then interleave the second interleaved data bitstream (y_k) in accordance with the following: z_k^(i_ss)=y_r^(i_ss) and r=s*⌊k/s⌋+(k-((2*(i_ss-1))mod 3+3*⌊(i_ss-1)/3⌋)*Nrot*N_BPSCS)mod N_CBPSS, where 1≤i_ss≤N_ss, k=0, 1, . . . , N_CBPSS-1, N_CBPSS is the number of the coded bits per spatial stream, and NROT is a frequency rotation that is an integer based on a bandwidth of the packet.

In Example 12, the subject matter of any of Examples 1-11 can optionally include where the access point is at least one from the following group: a high-efficiency wireless local area network (HEW) station, a master station, an Internet of Things wireless device, an Institute of Electrical and Electronic Engineers (IEEE) 802.11ax access point, an IEEE 802.11ax station, a station, and an access point.

In Example 13, the subject matter of any of Examples 1-12 can optionally include where the apparatus further comprises transceiver circuitry coupled to the processing circuitry.

In Example 14, the subject matter of any of Examples 1-13 can optionally include where the circuitry further comprises one or more antennas coupled to the processing circuitry.

Example 15 is a non-transitory computer-readable storage medium that stores instructions for execution by one or more processors, the instructions to configure the one or more processors to cause an apparatus to: split a data bitstream between an antenna bitstream and a symbol bitstream; encode the data bitstream into a plurality of orthogonal frequency-division multiplexing (OFDM) symbols from a signal constellation; encode the antenna bitstream into a plurality of antenna indices from a space constellation; map the OFDM symbols to a plurality of subcarriers of a channel and associate the OFDM symbols with an index of the plurality of antenna indices; and configure the access point for transmission of the symbols on the channel in accordance with an associated one of the antenna indices. The apparatus may be of an access point.

In Example 16, the subject matter of Example 15 can optionally include where a number of coded bits to be transmitted for the plurality of subcarriers is mN_ss+n, wherein n=log_2 N where N is an alphabet size of the space constellation, m=log_2 M, where in is the number of coded bits for each subcarrier and M is a signal constellation alphabet size, and N_ss is a number of spatial streams in accordance with a modulation and coding scheme (MCS).

In Example 17, the subject matter of Examples 15 or 16 can optionally include where the transmission is in accordance with spatial modulation (SM) and OFDM.

In Example 18, the subject matter of any of Examples 15-17 can optionally include where the instructions further configure the one or more processors to cause the apparatus to: encode a data portion of the packet with a number of the plurality of symbols, NSYM, wherein NSYM==m_STBC ⌈(8*length+16+6*N_ES)/(m_STBC[R*LCM((mN_ss+n)*N_ds, R^(-1))])⌉, where R is a code rate of the modulation and coding scheme (MCS), N_ES is a number of block convolution coding (BCC) encoders, Nds is the number of the data subcarriers at each OFDM symbol, NSS is the number of spatial streams (SS), length is a value of a length field in octets of the data portion of the packet, m_STBC is equal to 2 for space-time block code (STBC) mode and 1 otherwise, and LCM is the least common multiple (LCM).

In Example 19, the subject matter of any of Examples 15-18 can optionally include where the instructions further configure the one or more processors to cause the apparatus to: interleave the antenna bitstream (xi) with a first interleaver to produce a first interleaved bitstream (wK), wherein the interleave is in accordance with the following: w_K=x_i, where i=Nrow*(k mod Ncol)+⌊k/(Ncol)⌋, k=0, 1, . . . , n*N_DS-1, where n is a number of coded bits per subcarrier for each spatial stream and $N_{DS}$ is the number of the data subcarriers at each OFDM symbol.

Example 20 is a method performed by an apparatus, the method comprising: splitting a data bitstream between an antenna bitstream and a symbol bitstream; encoding the data bitstream into a plurality of orthogonal frequency-division multiplexing (OFDM) symbols from a signal constellation; encoding the antenna bitstream into a plurality of antenna indices from a space constellation; mapping the OFDM symbols to a plurality of subcarriers of a channel and associate the OFDM symbols with an index of the plurality of antenna indices; and; configuring the access point for transmission of the symbols on the channel in accordance with an associated one of the antenna indices.

In Example 21, the subject matter of Example 20 can optionally include where a number of coded bits to be transmitted for the plurality of subcarriers is mN_ss+n, wherein n=log_2 N where N is a space constellation alphabet size, and where m is the number of coded bits for each subcarrier and where m=log_2 M where M is a signal constellation alphabet size, and N_ss is a number of spatial streams in accordance with a modulation and coding scheme (MCS).

Example 22 is an apparatus comprising memory and circuitry coupled to the memory, the processing circuitry configured to: configure the access point to receive a plurality of orthogonal frequency-division multiplexing (OFDM) symbols, one for each of a plurality of subcarriers of a channel, in accordance with an antenna index on the channel; decode the plurality of symbols in accordance with a signal constellation to produce a data bitstream; decode the antenna index in accordance with a space constellation to produce an antenna bitstream; and join the data bitstream with the antenna bitstream to produce a data bitstream. The apparatus may be of a station (STA).

In Example 23, the subject matter of Example 2 can optionally include where a number of coded bits to be received for the plurality of subcarriers is mN_ss+n, wherein n=log_2 N where N is an alphabet size of the space constellation, m=log_2 M, where m is the number of coded bits for each subcarrier and M is a signal constellation alphabet size, and N_ss is a number of spatial streams in accordance with a modulation and coding scheme (MCS).

In Example 24, the subject matter of Examples 22 or 23 can optionally include where the data bitstream comprises a data portion of a packet, and wherein the data portion comprises a number of OFDM symbols, NSYM, wherein NSYM=m_STBC ⌈(8*length+6+6*N_ES)/(m_STBC [R*LCM((mN_ss+n)*N_ds, R^(-1))])⌉, where R is a code rate of the modulation and coding scheme (MCS), N_ES is a number of block convolution coding (BCC) encoders, Nds is the number of the data subcarriers at each OFDM symbol, NSS is the number of spatial streams (SS), length is a value of a length field in octets of the data portion of the packet, m_STBC is equal to 2 for space-time block code (STBC) mode and 1 otherwise, and LCM is the least common multiple (LCM).

In Example 25, the subject matter of any of Examples 22-24 can optionally include where the apparatus further comprises one or more antennas coupled to the processing circuitry.

Example 26 is an apparatus: means for splitting a data bitstream between an antenna bitstream and a symbol bitstream; means for encoding the data bitstream into a plurality of orthogonal frequency-division multiplexing (OFDM) symbols from a signal constellation; means for encoding the antenna bitstream into a plurality of antenna indices from a space constellation; means for mapping the OFDM symbols to a plurality of subcarriers of a channel and associate the OFDM symbols with an index of the plurality of antenna indices; and means for configuring the access point for transmission of the symbols on the channel in accordance with an associated one of the antenna indices. The apparatus may be of an access point.

In Example 27, the subject matter of Example 26 can optionally include where a number of coded bits to be transmitted for the plurality of subcarriers is mN_ss+n, wherein n=log_2 N where N is an alphabet size of the space constellation, m=log_2 M, where m is the number of coded bits for each subcarrier and M is a signal constellation alphabet size, and N_ss is a number of spatial streams in accordance with a modulation and coding scheme (MCS).

In Example 28, the subject matter of Examples 26 or 27 can optionally include where a packet comprises the plurality of symbols and the plurality of antenna indices, and further comprising: means for configuring the access point for transmission of the packet in accordance with spatial modulation (SM) and OFDM.

In Example 29, the subject matter of Example 28 can optionally include where the packet is to be transmitted in accordance with multiple-input and multiple-output (MIMO).

In Example 30, the subject matter of Example 28 can optionally include means for encoding a data portion of the packet with a number of the plurality of symbols, NSYM, wherein NSYM=m_STBC ⌈(8*length+16+6*N_ES)/(m_STBC [R*LCM((mN_ss+n)*N_ds, R^(-1))])⌉, where R is a code rate of the modulation and coding scheme (MCS), N_ES is a number of block convolution coding (BCC) encoders, Nds is the number of the data subcarriers at each OFDM symbol, NSS is the number of spatial streams (SS), length is a value of a length field in octets of the data portion of the packet, m_STBC is equal to 2 for space-time block code (STBC) mode and 1 otherwise, and LCM is the least common multiple (LCM).

In Example 31, the subject matter of Example 30 can optionally include means for padding the data portion of the packet with a number of padding bits (NPad), wherein ⌈N⌉_Pad=N_SYM*R*LCM((mN_ss+n)*N_ds, R^(-1))−(8*length+16+6*N_ES).

In Example 32, the subject matter of any of Examples 26-31 can optionally include before the split, means for encoding the data bitstream with a block convolution code (BCC), wherein a number of rows and a number of columns for the BCC is one from the following group: (13, 4×N_BPSCS), (18, 6*N_BPSCS), and (26, 9*N_BPSCS), where N_BPSCS is a number of coded bits per subcarrier for each spatial stream (SS).

In Example 33, the subject matter of any of Examples 26-32 can optionally include means for interleaving the antenna bitstream (xi) with a first interleaver to produce a first interleaved bitstream (wK), wherein the interleave is in accordance with the following: w_K=x_i, where i=Nrow*(k mod Ncol)+⌊k/(Ncol)⌋, k=0, 1, . . . , n*N_DS−1, where n is a number of coded bits per subcarrier for each spatial stream and $N_{DS}$ is the number of the data subcarriers at each OFDM symbol.

In Example 34, the subject matter of Example 33 can optionally include means for interleaving the first interleaved bitstream (wK) with a second interleaver to produce a second interleaved bitstream (y_k), wherein the interleave is in accordance with the following: y_k=w_j, and j=s*⌊k/s⌋+(k+n*N_ds−⌊(Ncol*k)/(n*⌈N⌉_DS)⌋)mod s, where k=0, 1, . . . , n*N_ds−1, and s=max {1,n/2}, which is a single axis block size of a constellation point, and wherein the processing circuitry is further configured to: means for encoding the second interleaved bitstream (y_k) into the plurality of antenna indices from a space constellation.

In Example 35, the subject matter of Example 34 can optionally include means for applying the first interleaver and the second interleaver to the data bitstream to produce a second interleaved data bitstream; and means for encoding the second interleaved data bitstream into the plurality of OFDM symbols from the signal constellation.

In Example 36, the subject matter of Examples 35 can optionally include if more than one spatial stream is to be used, then means for interleaving the second interleaved data bitstream (y_k) in accordance with the following: z_k^(i_ss)=y_r^(i_ss) and r=s*⌊k/s⌋+(k−((2*(i_ss−1))mod 3+3*⌊(i_ss−1)/3⌋)*Nrot*N_BPSCS)mod N_CBPSS, where 1≤i_ss≤N_ss, k=0, 1, . . . , N_CBPSS−1, N_CBPSS is the number of the coded bits per spatial stream, and $N_{ROT}$ is a frequency rotation that is an integer based on a bandwidth of the packet.

In Example 37, the subject matter of Example 37 can optionally include where the access point is at least one from the following group: a high-efficiency wireless local area network (HEW) station, a master station, an Internet of Things wireless device, an Institute of Electrical and Electronic Engineers (IEEE) 802.11ax access point, an IEEE 802.11ax station, a station, and an access point.

In Example 38, the subject matter of any of Examples 26-37 can optionally include means for transmitting and receiving radio signals.

Example 39 is an apparatus comprising: means for configuring the access point to receive a plurality of orthogonal frequency-division multiplexing (OFDM) symbols, one for each of a plurality of subcarriers of a channel, in accordance with an antenna index on the channel; means for decoding the plurality of symbols in accordance with a signal constellation to produce a data bitstream; means for decoding the antenna index in accordance with a space constellation to produce an antenna bitstream; and means for joining the data bitstream with the antenna bitstream to produce a data bitstream. The apparatus may be of a station (STA).

In Example 40, the subject matter of Example 39 can optionally include where a number of coded bits to be received for the plurality of subcarriers is mN_ss+n, wherein n==log_2 N where N is an alphabet size of the space constellation, m=log_2 M, where m is the number of coded bits for each subcarrier and M is a signal constellation alphabet size, and N_ss is a number of spatial streams in accordance with a modulation and coding scheme (MCS).

In Example 41, the subject matter of Examples 39 or 40 can optionally include where the data bitstream comprises a data portion of a packet, and wherein the data portion comprises a number of OFDM symbols, NSYM, wherein NSYM=
   m_STBC [(8*length+16+6*N_ES)/(m_STBC [R*LCM ((mN_ss+n)*N_ds, R^(−1)])], where R is a code rate of the modulation and coding scheme (MCS), N_ES is a number of block convolution coding (BCC) encoders, Nds is the number of the data subcarriers at each OFDM symbol, NSS is the number of spatial streams (SS), length is a value of a length field in octets of the data portion of the packet, m_STBC is equal to 2 for space-time block code (STBC) mode and 1 otherwise, and LCM is the least common multiple (LCM).

In Example 42, the subject matter of Examples 39-41 can optionally include means for transmitting and receiving radio signals.

Example 43 is a method performed by a station (STA), the method comprising: configuring the access point to receive a plurality of orthogonal frequency-division multiplexing (OFDM) symbols, one for each of a plurality of subcarriers of a channel, in accordance with an antenna index on the channel; decoding the plurality of symbols in accordance with a signal constellation to produce a data bitstream; decoding the antenna index in accordance with a space constellation to produce an antenna bitstream; and joining the data bitstream with the antenna bitstream to produce a data bitstream.

In Example 44, the subject matter of Example 44 can optionally include where a number of coded bits to be received for the plurality of subcarriers is mN_ss+n, wherein n=log_2 N where N is an alphabet size of the space constellation, m=log_2 M, where m is the number of coded bits for each subcarrier and M is a signal constellation alphabet size, and N_ss is a number of spatial streams in accordance with a modulation and coding scheme (MCS).

In Example 45, the subject matter of Examples 42 or 43 can optionally include where the data bitstream comprises a data portion of a packet, and wherein the data portion comprises a number of OFDM symbols, NSYM, wherein NSYM=
   m_STBC [(8*length+16+6*N_ES)/(m_STBC [R*LCM ((mN_ss+n)*N_ds, R^(−1)])], where R is a code rate of the modulation and coding scheme (MCS), N_ES is a number of block convolution coding (BCC) encoders, Nds is the number of the data subcarriers at each OFDM symbol, NSS is the number of spatial streams (SS), length is a value of a length field in octets of the data portion of the packet, m_STBC is equal to 2 for space-time block code (STBC) mode and 1 otherwise, and LCM is the least common multiple (LCM).

In Example 46, the subject matter of any of Examples 42-45 can optionally include receiving the plurality of OFDM symbols.

Example 47 is a non-transitory computer-readable storage medium that stores instructions for execution by one or more processors, the instructions to configure the one or more processors to cause an apparatus to: configure the access point to receive a plurality of orthogonal frequency-division multiplexing (OFDM) symbols, one for each of a plurality of subcarriers of a channel, in accordance with an antenna index on the channel; decode the plurality of symbols in accordance with a signal constellation to produce a data bitstream; decode the antenna index in accordance with a space constellation to produce an antenna bitstream; and join the data bitstream with the antenna bitstream to produce a data bitstream. The apparatus may be of a station (STA).

In Example 48, the subject matter of Examples 47 can optionally include where a number of coded bits to be received for the plurality of subcarriers is mN_ss+n, wherein n=log_2 N where N is an alphabet size of the space constellation, m=log_2 M, where m is the number of coded bits for each subcarrier and M is a signal constellation alphabet size, and N_ss is a number of spatial streams in accordance with a modulation and coding scheme (MCS).

In Example 49, the subject matter of Examples 47 or 48 can optionally include where the data bitstream comprises a data portion of a packet, and wherein the data portion comprises a number of OFDM symbols, NSYM, wherein NSYM=
   m_STBC [(8*length+16+6*N_ES)/(m_STBC [R*LCM ((mN_ss+n)*N_ds, R^(−1)])], where R is a code rate of the modulation and coding scheme (MCS), N_ES is a number of block convolution coding (BCC) encoders, Nds is the number of the data subcarriers at each OFDM symbol, NSS is the number of spatial streams (SS), length is a value of a length field in octets of the data portion of the packet, m_STBC is equal to 2 for space-time block code (STBC) mode and 1 otherwise, and LCM is the least common multiple (LCM).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising: memory; and, processing circuitry coupled to the memory, the processing circuitry configured to:
   split a data bitstream between an antenna bitstream and a symbol bitstream;
   encode the data bitstream into a plurality of orthogonal frequency-division multiplexing (OFDM) symbols from a signal constellation;
   interleave the antenna bitstream with an antenna selection (AS) interleaver according to a first interleaver permutation to produce a first interleaved bitstream;
   interleave the first interleaved bitstream with the AS interleaver according to a second interleaver permutation to produce a second interleaved bitstream;
   encode the second interleaved bitstream into a plurality of antenna indices from a space constellation, wherein the plurality of antenna indices comprises antenna configurations of two or more active antennas;
   map the OFDM symbols to a plurality of subcarriers of a channel and associate the OFDM symbols with an index of the plurality of antenna indices;

configure an access point for transmission of the symbols on the channel in accordance with an associated one of the antenna indices; and encode a data portion of the packet with a number of the plurality of symbols $N_{SYM}$, wherein $N_{SYM}$ is based on $$N_{SYM} = m_{STBC} \left\lceil \frac{8*length + 16 + 6*N_{ES}}{m_{STBC}[R*LCM((mN_{ss}+n)*N_{ds}, R^{-1})]} \right\rceil,$$

where R is a code rate of the modulation and coding scheme (MCS), $N_{ES}$ is a number of block convolution coding (BCC) encoders, $N_{ds}$ is the number of the data subcarriers at each OFDM symbol, $N_{SS}$ is the number of spatial streams (SS), length is a value of a length field in octets of the data portion of the packet, $m_{STBC}$ is equal to 2 for space-time block code (STBC) mode and 1 otherwise, and LCM is the least common multiple (LCM), wherein $n=\log_2 N$ where N is an alphabet size of the space constellation, $m=\log_2 M$, where m is the number of coded bits for each subcarrier and M is a signal constellation alphabet size, and $N_{SS}$ is a number of spatial streams in accordance with a modulation and coding scheme (MCS).

2. The apparatus of claim 1, wherein a packet comprises the plurality of symbols and the plurality of antenna indices, and wherein the processing circuitry is further configured to:
configure the access point for transmission of the packet in accordance with spatial modulation (SM) and OFDM.

3. The apparatus of claim 2, wherein the packet is to be transmitted in accordance with multiple-input and multiple-output (MIMO).

4. The apparatus of claim 1, wherein the processing circuitry is further configured to:
pad the data portion of the packet with a number of padding bits ($N_{Pad}$), wherein $N_{Pad} = N_{SYM}*R*LCM((mN_{ss}+n)*N_{ds}, R^{-1})-(8*length+16+6*N_{ES})$.

5. The apparatus of claim 1, wherein the processing circuitry is further configured to:
before the split, encode the data bitstream with a block convolution code (BCC), wherein a number of rows and a number of columns for the BCC is one from the following group: (13, 4×$N_{BPSCS}$), (18, 6*$N_{BPSCS}$), and (26, 9*$N_{BPSCS}$), where $N_{BPSCS}$ is a number of coded bits per subcarrier for each spatial stream (SS).

6. The apparatus of claim 1, wherein the first interleaver is in accordance with the following:
$w_K = x_i$, where $$i = Nrow*(k \bmod Ncol) + \left\lfloor \frac{k}{Ncol} \right\rfloor,$$

$k=0, 1, \ldots, n*N_{DS}-1$, where n is a number of coded bits per subcarrier for each spatial stream and $N_{DS}$ is the number of the data subcarriers at each OFDM symbol, wherein $x_i$ is the antenna bitstream and $w_k$ is the first interleaved bitstream.

7. The apparatus of claim 6, wherein the second interleaver is in accordance with the following:

$$y_k = w_j, \text{ and } j = s*\left\lfloor \frac{k}{s} \right\rfloor + \left(k + n*N_{ds} - \left\lfloor \frac{Ncol*k}{n*N_{ds}} \right\rfloor\right) \bmod s,$$

where $k=0, 1, \ldots, n*N_{ds}-1$, and $$s = \max\left\{1, \frac{n}{2}\right\},$$

which is a single axis block size of a constellation point, and wherein the processing circuitry is further configured to:
encode the second interleaved bitstream $y_k$ into the plurality of antenna indices from a space constellation, wherein $y_k$ is the second interleaved bitstream.

8. The apparatus of claim 7, wherein the processing circuitry is further configured to:
apply the first interleaver and the second interleaver to the data bitstream to produce a second interleaved data bitstream; and
encode the second interleaved data bitstream into the plurality of OFDM symbols from the signal constellation.

9. The apparatus of claim 8, wherein the processing circuitry is further configured to:
if more than one spatial stream is to be used, then interleave the second interleaved data bitstream ($y_k$) in accordance with the following:

$$z_k^{iss} = y_r^{iss} \text{ and } r =$$

$$s*\left\lfloor \frac{k}{s} \right\rfloor + \left(k - \left((2*(i_{ss}-1))\bmod 3 + 3*\left\lfloor \frac{i_{ss}-1}{3} \right\rfloor\right)*Nrot*N_{BPSCS}\right)$$

$$\bmod N_{CBPSS}.$$

where $1 \le i_{ss} \le N_{SS}$, $k=0, 1, \ldots, N_{CBPSS}-1$, $N_{CBPSS}$ is the number of the coded bits per spatial stream, and $N_{ROT}$ is a frequency rotation that is an integer based on a bandwidth of the packet.

10. The apparatus of claim 1, wherein the access point is at least one from the following group:
a high-efficiency wireless local area network (HEW) station, a master station, an Internet of Things wireless device, an Institute of Electrical and Electronic Engineers (IEEE) 802.11ax access point, an IEEE 802.11ax station, a station, and an access point.

11. The apparatus of claim 1, wherein the apparatus further comprises transceiver circuitry coupled to the processing circuitry.

12. The apparatus of claim 1, wherein the circuitry further comprises one or more antennas coupled to the processing circuitry.

13. A non-transitory computer-readable storage medium that stores instructions for execution by one or more processors, the instructions to configure the one or more processors to cause an apparatus to:
split a data bitstream between an antenna bitstream and a symbol bitstream;
encode the data bitstream into a plurality of orthogonal frequency-division multiplexing (OFDM) symbols from a signal constellation;
encode the antenna bitstream into a plurality of antenna indices from a space constellation;
interleave the antenna bitstream with an antenna selection (AS) interleaver according to a first interleaver permutation to produce a first interleaved bitstream;
interleave the first interleaved bitstream with the AS interleaver according to a second interleaver permutation to produce a second interleaved bitstream;
encode the second interleaved bitstream into a plurality of antenna indices from a space constellation, wherein the plurality of antenna indices comprises antenna configurations of two or more active antennas;
map the OFDM symbols to a plurality of subcarriers of a channel and associate the OFDM symbols with an index of the plurality of antenna indices;
configure an access point for transmission of the symbols on the channel in accordance with an associated one of the antenna indices; and encode a data portion of the packet with a number of the plurality of symbols $N_{SYM}$, wherein $N_{SYM}$ is based on $$m_{STBC}\left\lceil \frac{8*length + 16 + 6*N_{ES}}{m_{STBC}[R*LCM((mN_{ss}+n)*N_{ds}, R^{-1})]} \right\rceil,$$

where R is a code rate of the modulation and coding scheme (MCS), $N_{ES}$ is a number of block convolution coding (BCC) encoders, $N_{ds}$ is the number of the data subcarriers at each OFDM symbol, $N_{SS}$ is the number of spatial streams (SS), length is a value of a length field in octets of the data portion of the packet, $m_{STBC}$ is equal to 2 for space-time block code (STBC) mode and 1 otherwise, and LCM is the least common multiple (LCM), wherein n=$\log_2$N where N is an alphabet size of the space constellation m=$\log_2$M, where m is the number of coded bits for each subcarrier and M is a signal constellation alphabet size, and $N_{ss}$ is a number of spatial streams in accordance with a modulation and coding scheme (MCS).

14. The non-transitory computer-readable storage medium of claim 13, wherein the transmission is in accordance with spatial modulation (SM) and OFDM.

15. The non-transitory computer-readable storage medium of claim 13, wherein the first interleaver is in accordance with the following:

$w_K = x_i$, where $$i = Nrow*(k \bmod Ncol) + \left\lfloor \frac{k}{Ncol} \right\rfloor,$$

k=0, 1, ..., n*$N_{DS}$−1, where n is a number of coded bits per subcarrier for each spatial stream and $N_{DS}$ is the number of the data subcarriers at each OFDM symbol, wherein $x_i$ is the antenna bitstream and $w_k$ is the first interleaved bitstream.

16. A method performed by an apparatus, the method comprising:
splitting a data bitstream between an antenna bitstream and a symbol bitstream;
encoding the data bitstream into a plurality of orthogonal frequency-division multiplexing (OFDM) symbols from a signal constellation;
encoding the antenna bitstream into a plurality of antenna indices from a space constellation;
interleaving the antenna bitstream with an antenna selection (AS) interleaver according to a first interleaver permutation to produce a first interleaved bitstream;
interleaving the first interleaved bitstream with the AS interleaver according to a second interleaver permutation to produce a second interleaved bitstream;
encoding the second interleaved bitstream into a plurality of antenna indices from a space constellation, wherein the plurality of antenna indices comprises antenna configurations of two or more active antennas;
mapping the OFDM symbols to a plurality of subcarriers of a channel and associate the OFDM symbols with an index of the plurality of antenna indices;
configuring an access point for transmission of the symbols on the channel in accordance with an associated one of the antenna indices; and
encoding a data portion of the packet with a number of the plurality of symbols, $N_{SYM}$, wherein $N_{SYM}$ is based on $$m_{STBC}\left\lceil \frac{8*length + 16 + 6*N_{ES}}{m_{STBC}[R*LCM((mN_{ss}+n)*N_{ds}, R^{-1})]} \right\rceil,$$

where R is a code rate of the modulation and coding, scheme (MCS), $N_{ES}$ is a number of block convolution coding (BCC) encoders, $N_{ds}$ is the number of the data subcarriers at each OFDM symbol, $N_{SS}$ is the number of spatial streams (SS), length is a value of a length field in octets of the data portion of the packet, $m_{STBC}$ is equal to 2 for space-time block code (STBC) mode and 1 otherwise and LCM is the least common multiple (LCM), wherein n=$\log_2$N where N is an alphabet size of the space constellation, m=$\log_2$M, where m is the number of coded bits for each subcarrier and M is a signal constellation alphabet size, and $N_{ss}$ is a number of spatial streams in accordance with a modulation and coding scheme (MCS).

17. An apparatus comprising: memory; and, processing circuitry coupled to the memory, the processing circuitry configured to:
configure a station to receive a plurality of orthogonal frequency-division multiplexing (OFDM) symbols, one for each of a plurality of subcarriers of a channel, in accordance with an antenna index on the channel;
decode the plurality of symbols in accordance with a signal constellation to produce a data bitstream;
decode the antenna index in accordance with a space constellation to produce an antenna bitstream; and
join the data bitstream with the antenna bitstream to produce a data bitstream, wherein the data bitstream comprises a data portion of a packet, and wherein the data portion comprises a number of OFDM symbols, $N_{SYM}$, wherein $N_{SYM}$ is based on $$m_{STBC}\left\lceil \frac{8*length + 16 + 6*N_{ES}}{m_{STBC}[R*LCM((mN_{SS}+n)*N_{ds}, R^{-1})]} \right\rceil,$$

where R is a code rate of the modulation and coding scheme (MCS), $N_{ES}$ is a number of block convolution coding (BCC) encoders, $N_{ds}$ is the number of the data subcarriers at each OFDM symbol, $N_{SS}$ is the number of spatial streams (SS), length is a value of a length field in octets of the data portion of the packet, $m_{STBC}$ is equal to 2 for space-time block code (STBC) mode and 1 otherwise, and LCM is the least common multiple (LCM), wherein a number of coded bits to be received for the plurality of subcarriers is $mN_{ss}$+n, wherein n=$\log_2$N where N is an alphabet size of the space constellation m=$\log_2$M, where m is the number of coded bits for each subcarrier and M is a signal constellation alphabet size, and $N_{ss}$ is a number of spatial streams in accordance with a modulation and coding scheme (MCS).

18. The apparatus of claim 17, wherein the apparatus further comprises one or more antennas coupled to the processing circuitry.

19. The apparatus of claim 1, wherein the memory is configured to:
store the data bitstream, the antenna bitstream, and the symbol bitstream.

20. The apparatus of claim 1, wherein the memory is configured to:
store the OFDM symbols and the data bitstream.

* * * * *